(12) United States Patent
Ausderau

(10) Patent No.: US 8,547,083 B2
(45) Date of Patent: Oct. 1, 2013

(54) APPARATUS FOR DETERMINATION OF THE AXIAL POSITION OF THE ARMATURE OF A LINEAR MOTOR

(75) Inventor: Daniel Ausderau, Frauenfeld (CH)

(73) Assignee: NTI AG, Spreitenbach (CH)

( * ) Notice: Subject to any disclaimer, the term of this patent is extended or adjusted under 35 U.S.C. 154(b) by 349 days.

(21) Appl. No.: 12/561,961

(22) Filed: Sep. 17, 2009

(65) Prior Publication Data

US 2010/0072830 A1 Mar. 25, 2010

(30) Foreign Application Priority Data

Sep. 25, 2008 (EP) ..................................... 08165152

(51) Int. Cl.
*G01R 25/00* (2006.01)

(52) U.S. Cl.
USPC .................. 324/90; 324/207.11; 324/207.24; 318/687

(58) Field of Classification Search
USPC ..... 324/207.11, 90, 207.24, 117 H; 318/687, 318/38, 135
See application file for complete search history.

(56) References Cited

U.S. PATENT DOCUMENTS

| 4,665,362 | A | * | 5/1987 | Abel et al. | 324/207.2 |
| 5,990,583 | A | * | 11/1999 | Nanba et al. | 310/12.14 |
| 2004/0004405 | A1 | * | 1/2004 | Ausderau | 310/12 |
| 2008/0098839 | A1 | * | 5/2008 | Maruyama et al. | 74/412 R |
| 2008/0231255 | A1 | * | 9/2008 | Lepine et al. | 324/117 H |

FOREIGN PATENT DOCUMENTS

| DE | 103 28 753 A1 | 1/2004 |
| JP | 2002228486 A | * 8/2002 |
| WO | WO 02/48652 A1 | 6/2002 |

* cited by examiner

*Primary Examiner* — Jermele M Hollington
*Assistant Examiner* — Temilade S Rhodes-Vivour
(74) *Attorney, Agent, or Firm* — Kilpatrick Townsend & Stockton LLP

(57) ABSTRACT

An apparatus (2;3;4;5) for determination of the axial position of the armature (11) of a linear motor comprises at least one pair of magnetically permeable, annular elements (12;20,21; 30,31,34,35;40,41,44,45;48;50,51), which are arranged essentially coaxially and at a short distance ($d_r$;$d_b$) from one another, such that an air gap (22;32,36;42,46) is formed between them, in which a magnetic field sensor (23;33,37; 43,47;$S_i$) for measurement of the magnetic field (B) in the air gap is arranged.

7 Claims, 10 Drawing Sheets

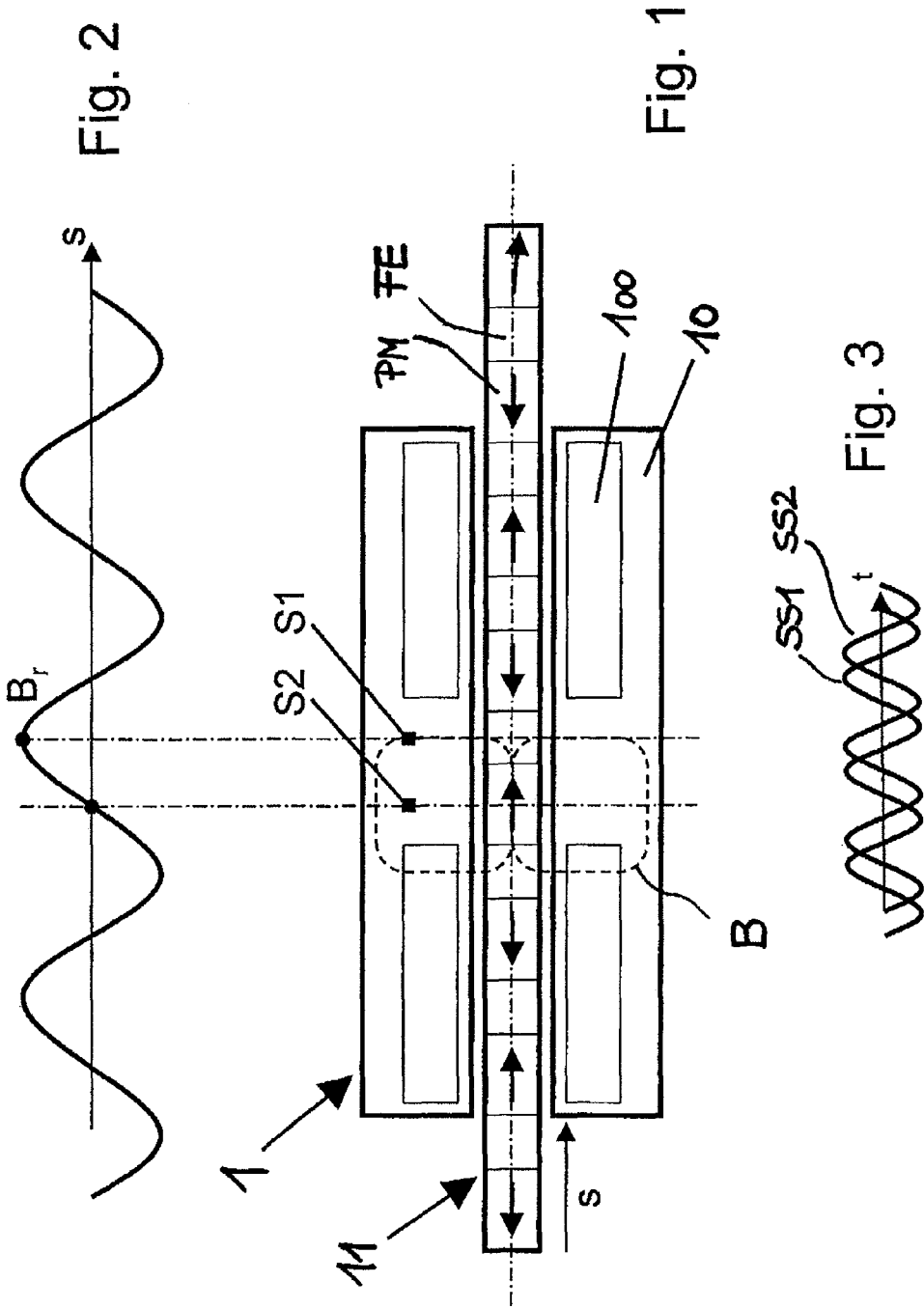

Figure 4:
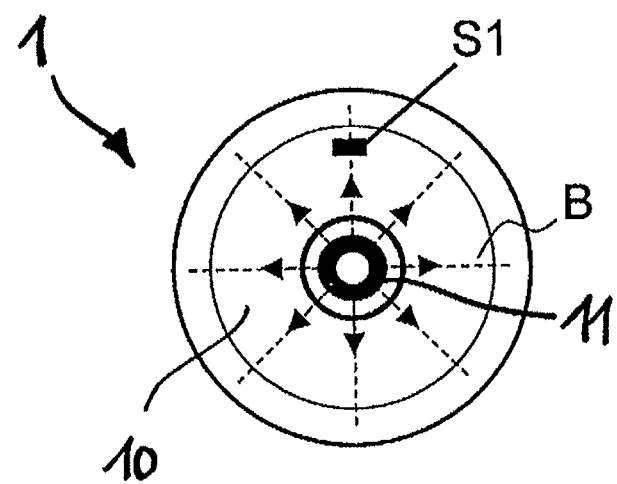

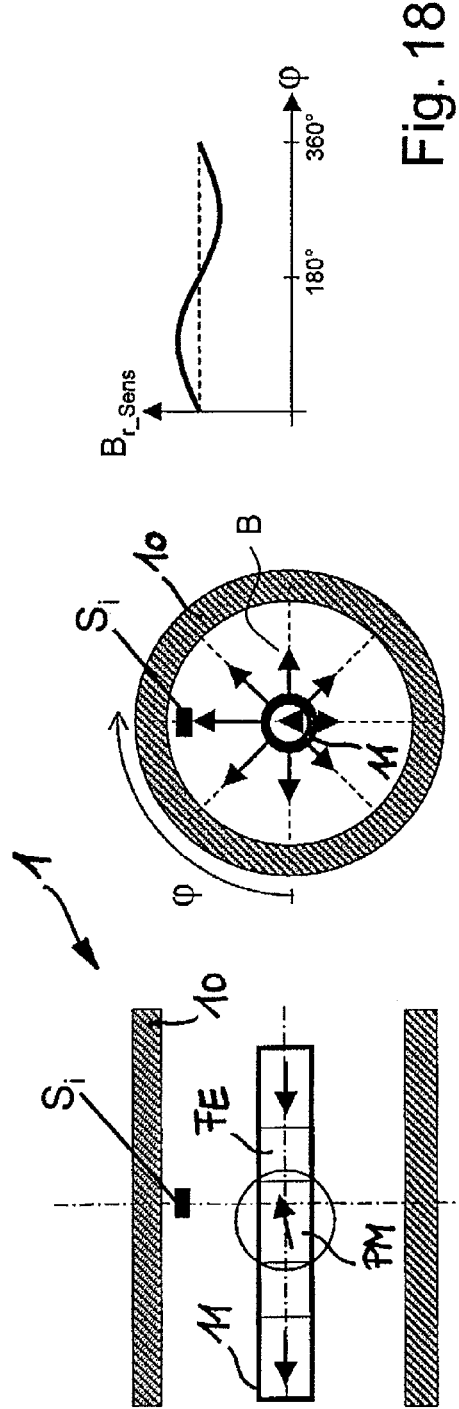
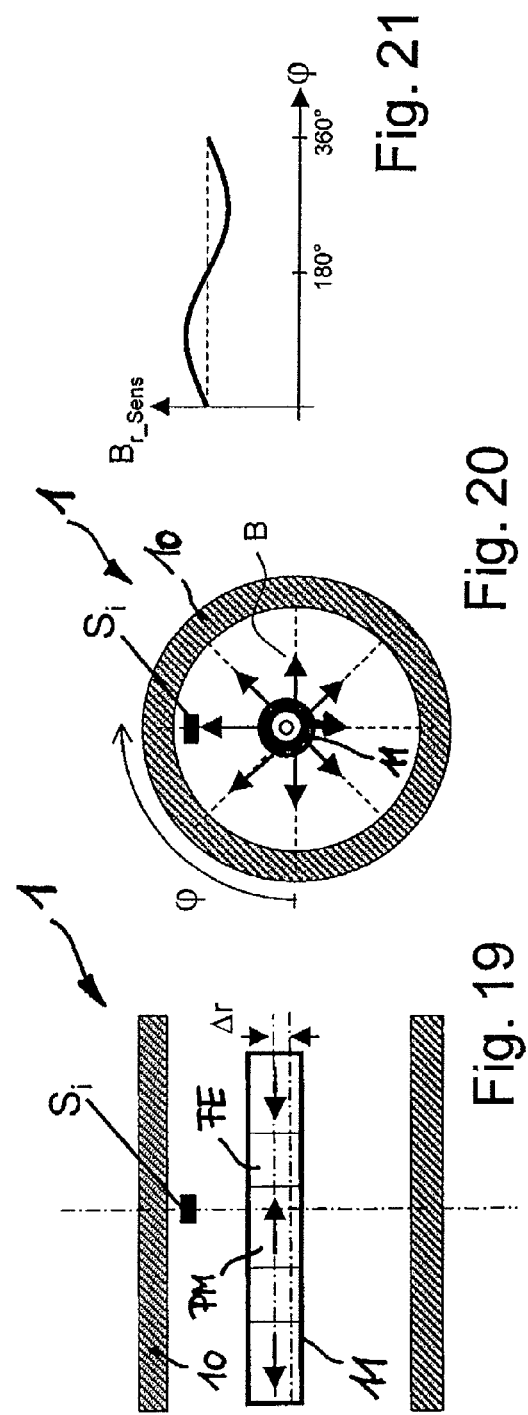

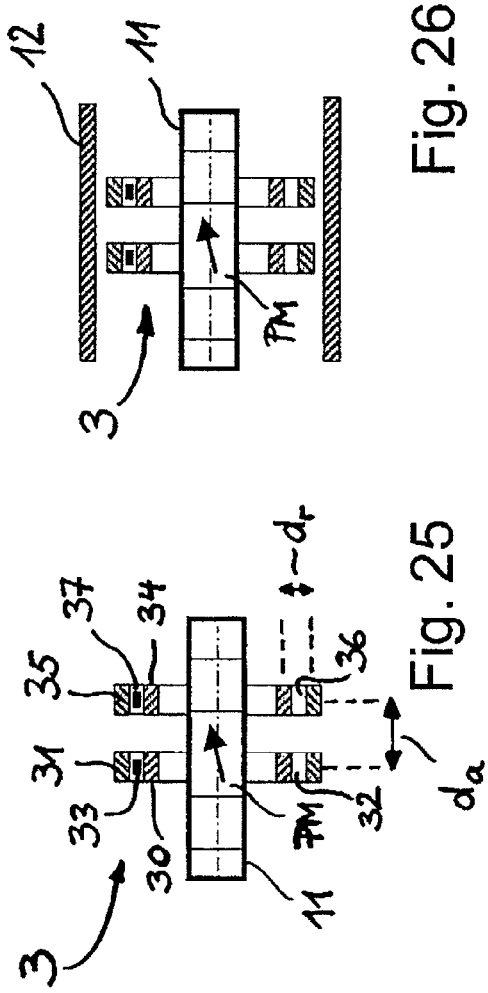
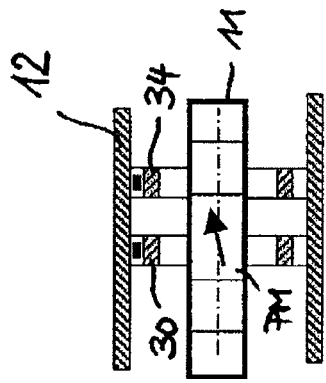
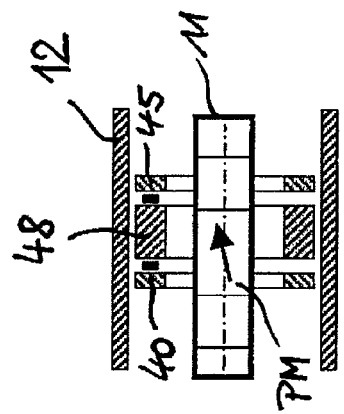
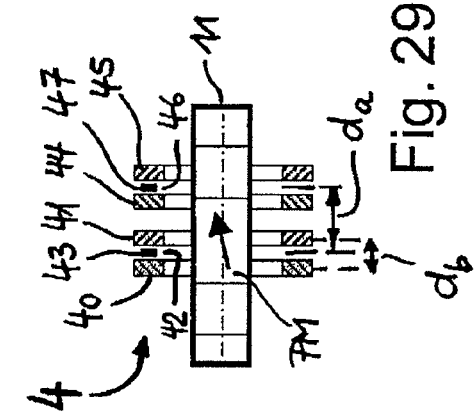
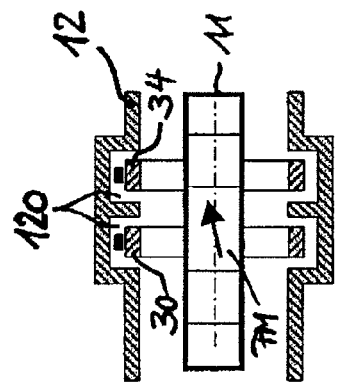
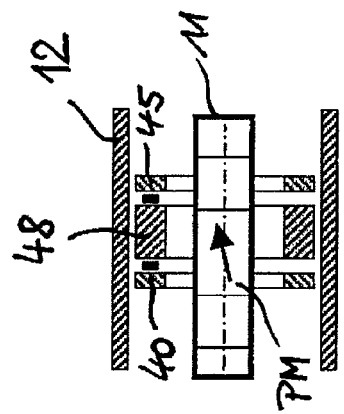

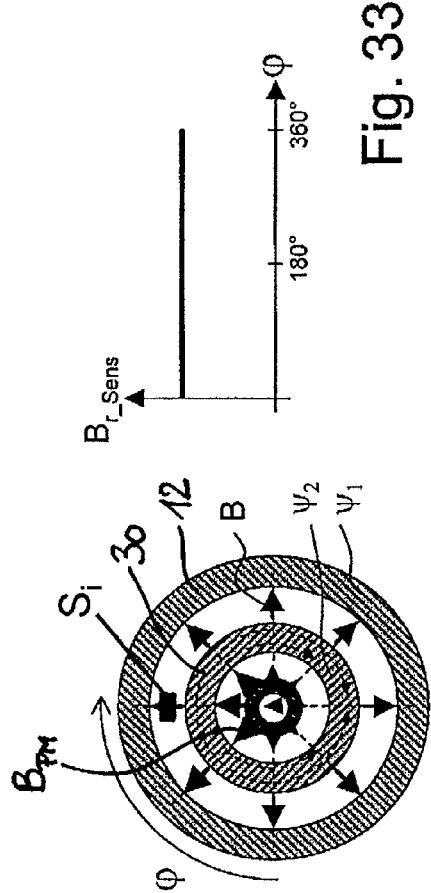
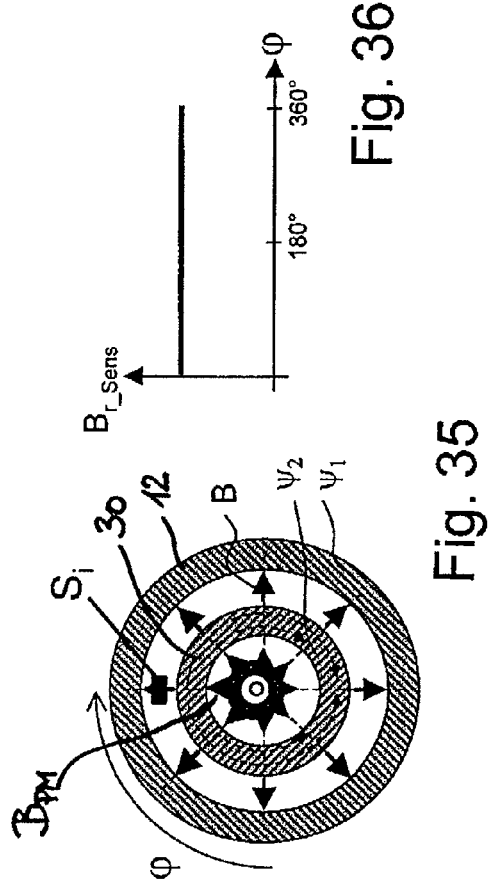

APPARATUS FOR DETERMINATION OF THE AXIAL POSITION OF THE ARMATURE OF A LINEAR MOTOR

This application claims the priority of European Application No. 08165152.3, filed on Sep. 25, 2008, the disclosure of which is incorporated herein by reference.

The invention relates to an apparatus for determination of the axial position of a linear motor.

Linear motors are used in innumerable fields of application. A linear motor always has a stator and an armature which can be moved in the axial direction—that is to say linearly—relative to said stator (hence also the name linear motor), as well as drive electronics, which are frequently also referred to as control. The force for driving the armature is typically produced by one of the two components, that is to say the armature and the stator, having permanent-magnetic excitation, and the other component (that is to say the stator or the armature) being provided with windings through which current can flow. The permanent-magnetic excitation is generally produced by discrete permanent magnets, which are arranged in a specific manner. Whether the permanent magnets are provided in the stator or in the armature and the windings accordingly in the other component frequently depends on the desired field of use and the circumstances there.

By way of example, the permanent magnets can be arranged in a tubular armature, with the tube being produced from a nonmagnetic material (for example aluminum or stainless steel). Considered in the longitudinal direction, the magnetization has, for example, the pattern N-S-N-S-N . . . (N=magnetic north pole, S=magnetic south pole). Magnetization such as this can be produced by joining together permanent magnet discs, iron disks and/or non-magnetic spacers. In principle, however, it is also feasible to use a long magnet bar, which is magnetized directly in the desired manner, instead of the joined-together individual permanent magnet disks.

One of the performance features of a linear motor such as this is accurate position control of the armature. This is based inter alia on accurate determination of the respective armature position. Various technical solutions are already known for determination of the armature position. In one of these solutions, the permanent magnets of the linear motor are themselves used as a "scale". In this approach, by way of example, two Hall effect sensors are used as sensors, which detect the magnetic field strength when the armature is moved past the Hall effect sensors. The Hall effect sensors are arranged offset with respect to one another in the axial direction, to be precise each through one quarter of the magnetic period of the essentially sine or cosine signal which is produced by the permanent magnets in the Hall effect sensors (or through one quarter plus an odd-numbered multiple of half the magnetic period). The position of the armature can therefore be determined within one period by sine-cosine evaluation (sensor signals). Whenever the linear motor is started up, an initialization run of the armature is carried out, as a result of which it is then possible to accurately determine the armature position in each case by counting down the periods and the sine-cosine evaluation. This technical solution has already been described, for example, in U.S. Pat. No. 6,316,848.

A linear motor 1 designed in this way is illustrated in FIG. 1. The linear motor 1 comprises a stator 10 and an armature 11, as well as two Hall effect sensors S1 and S2. A drive winding 100 is arranged in the stator 10, and the armature 11 comprises a number of axially magnetized permanent magnets PM, as well as iron disks FE arranged between these permanent magnets. The two sensors S1 and S2 are arranged at an axial distance from one another which corresponds to one quarter of a "magnetic period", in which case the expression magnetic period means that distance at which the same magnetization is repeated in the armature. Dashed lines in FIG. 1 indicate the idealized profile of the magnetic induction B, with FIG. 1 showing that the radial component $B_r$ of the magnetic induction has its maximum at the location of the sensor S1, while it is zero at the location of the sensor S2. In a corresponding manner, FIG. 2 shows the profile of the radial component $B_r$ of the magnetic induction over the distance s in the situation of the linear motor 1 as illustrated in FIG. 1. This fundamentally sinusoidal profile of the radial component $B_r$ of the magnetic induction via the location s is essentially moved past the sensors S1 and S2 during movement of the armature 11, thus resulting in the sensor signals SS1 and SS2 having a time profile as is plotted qualitatively against the time t in FIG. 3. The corresponding profile of the magnetic induction B at the location of the sensors S1 and S2 can be seen once again in the form of a cross section at the location of the respective sensors S1 (FIG. 4) and S2 (FIG. 5), respectively. As can be seen, the magnetic induction B at the location of the sensor S1 has only a radial component (see $B_r$ in FIG. 2), while this radial component is zero at the location of the sensor S2, and the magnetic induction B there has only an axial component.

The accuracy with which the armature position can now be determined in this case depends on a number of factors. The resolution (for example the number of bits to represent one specific armature position) and the accuracy of the sensors and of the evaluation electronics play a role. Furthermore, the geometric arrangement of the sensors as an entity in the stator is important (for example how accurately they lie on an axis which is parallel to the longitudinal axis of the linear motor), as well as the arrangement of the actual sensor elements within the sensor housing of the individual sensor. However, component tolerances and manufacturing tolerances can be compensated for by appropriate measurements and corrections. One correction method which is suitable for this purpose is described, for example, in U.S. Pat. No. 6,532,791. The magnetic field (for example the magnetic induction) can therefore be detected with high accuracy in practice.

With regard to magnetic field generation, various inaccuracies likewise come into play which may be relevant with regard to accurate determination and control of the armature position. These inaccuracies have different causes. For example, if one considers the situation in which the permanent magnets are arranged in the armature tube, the manufacturing tolerances of the individual components here (magnets, possible iron disks between the magnets, possible nonmagnetic spacers, armature tube, etc.) may be mentioned here. In addition to the manufacturing tolerances of the components, joint gaps and/or tilts as well as the offset from the center also occur in the arrangement (in one or more rows next to each other) of the components. Further inaccuracies result from the inhomogeneous magnetic characteristics of the components, in particular of the permanent magnets. Because of the manufacturing process, the permanent magnets normally have a non-uniform magnetization, distributed differently from the requirement, when considered over their volume.

As already indicated, in order to determine the armature position as accurately as possible, it is desirable for the magnetic induction (magnetic field strength) at the location of a sensor to be repeated as identically as possible during each magnetic period during operation. Assuming that the evaluation electronics know the exact signal profiles of the two sensors over a magnetic period and their phase angle with respect to one another—then the instantaneous armature position can be determined with high accuracy from the sensor signals, by means of appropriate signal processing.

However, in practice, various inaccuracies occur and also regularly mean that the magnetic field has a non-periodic—and therefore disturbing—field component over the movement range of the armature. Both manufacturing-dependent inaccuracies and operation-dependent states may be responsible for these disturbing field components.

As has already been described further above, the manufacturing-dependent inaccuracies include, for example, inhomogeneous magnetic characteristics of the permanent magnets. The magnetization of the permanent magnets which are used for assembly of the armature in particular do not always have the same magnetic characteristics, even if they have an identical geometric shape and size. For example, the magnetization of one or more of the permanent magnets can thus be locally limited or may differ from the specification over the entire volume of the permanent magnet with respect to the magnetization direction, and/or the magnetization strength. In the case under consideration in the example of a geometrically rotationally symmetrical magnet which is magnetized in the axial direction (this also applies analogously to other types of magnetization), it is therefore always possible for the magnetic field generated by this magnet not to be rotationally symmetrical. Furthermore, because of manufacturing tolerances during production, it is also possible that the direction of the magnetization will not exactly match the geometric longitudinal axis of the permanent magnet. For example, in addition to the axial component of the magnetization, the permanent magnet also has a diametric component which, overall, leads to non-rotationally symmetrical magnetization and to a corresponding non-rotationally symmetrical magnetic field. Magnetization which is not aligned completely axially therefore leads to a non-rotationally symmetrical magnetic field in its vicinity. Since the magnetization may vary from one permanent magnet to another, this results overall, together with the other permanent magnets which are arranged in the armature tube, in a field profile which is not periodic in the axial direction.

In the completely produced armature, geometric tolerances, in addition to the magnetically inhomogeneous characteristics, lead to non-periodic field profiles. On the one hand, discrepancies with respect to the specified form, for example the length and/or the diameter of the permanent magnets and/or of the iron disks, lead to non-periodic field profiles. Furthermore, further discrepancies from the specification can result during assembly (stacking of the permanent magnets and iron disks in the armature tube). In particular, in this case, the offset parallel to the axis of permanent magnets and iron disks whose diameter is too small with respect to the armature tube, or their tilting with respect to the longitudinal axis, can lead to additional discrepancies from the periodic profile of the magnetic field.

Figures 6, 7, 8, 9, 10, 11, 12, 13:
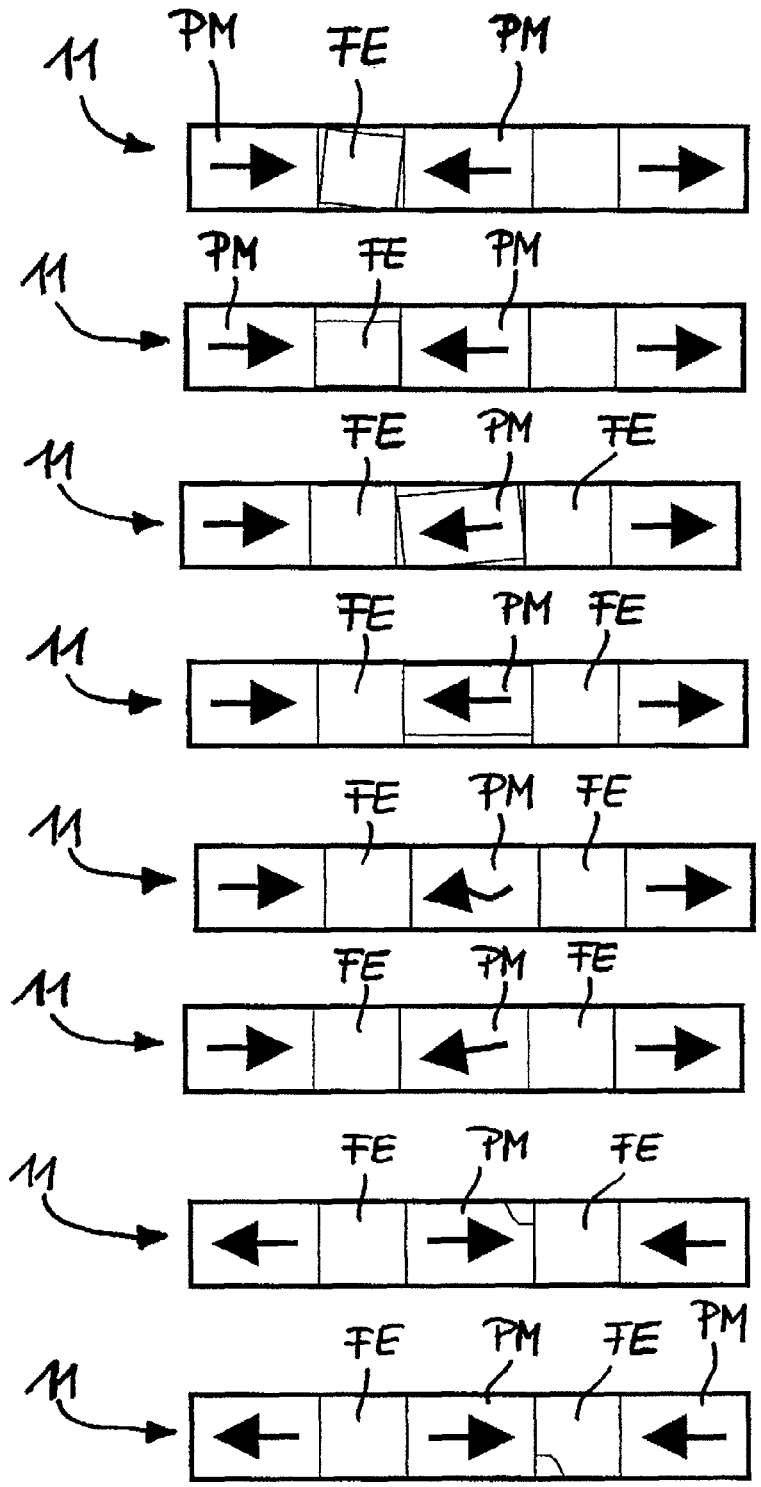

By way of example, the following text describes a number of the cases addressed with the aid of drawing illustrations, in which a discrepancy from a homogeneous field distribution can occur. FIG. 6 shows a detail from an armature 11, in which the permanent magnets PM are magnetized ideally axially, while the geometric dimensions of one of the iron disks FE are too small, and this iron disk FE is arranged tilted between two permanent magnets PM. FIG. 7 shows a detail of an armature 11 in which, although an iron disk FE is arranged axially oriented between two permanent magnets, its geometric dimensions are too small, however, and the axis of this excessively small iron disk FE does not coincide with the axis of the armature 11 (the iron disk FE is arranged with an offset parallel to the axis). FIG. 8 shows a detail of an armature 11 in which the geometric dimensions of one of the permanent magnets PM are too small, and this permanent magnet PM is arranged tilted between two iron disks FE. In a corresponding manner, FIG. 9 shows a detail from an armature 11 in which, although the permanent magnet PM is magnetized ideally axially and is also arranged in the axial direction between two iron disks FE, the geometric dimensions of the permanent magnet PM are, however, too small, and the axis of the permanent magnet PM does not coincide with the axis of the armature 11 (the permanent magnet is arranged with an offset parallel to the axis). The detail of the armature 11 shown in FIG. 10 shows that, although the permanent magnets PM and the iron disk FE have the desired geometric dimensions, the axial magnetization of one of the permanent magnets PM is, however, not homogeneous (curly arrow). FIG. 11 shows a detail of an armature 11 in which one of the permanent magnets PM is magnetized in a direction other than the axial direction. FIG. 12 shows a detail of an armature 11, in which one of the permanent magnets PM has an irregular discrepancy from the geometric shape, but otherwise has essentially the desired geometric dimensions. Finally, FIG. 13 shows a detail of an armature 11 in which, in a corresponding manner, one of the iron disks FE has an irregular discrepancy from the geometric shape, but otherwise essentially has the desired geometric dimensions. Further cases which lead to a discrepancy from the desired ideal distribution of the field which is excited by permanent magnets are feasible, in which case, it should be remembered in any case that components always have tolerances and that the illustrations in FIGS. 6 to 13 are highly idealized and are intended to explain only in principle how discrepancies from the desired ideal distribution of the field which is excited by permanent magnets can arise.

During operation, the magnetic induction (magnetic field strength) at the location of the sensor is dependent not only on the axial position of the armature, but also on any possible radial offset between the armature axis and the stator axis relative to one another. This can be seen, for example, in the detail of a linear motor 1 shown in FIG. 14, in which the armature 11 is offset parallel to the axis of the stator 10, in this context see also FIG. 19 and FIG. 20, with FIG. 20 showing the field distribution better. If the armature is moved in the radial direction from the stator center towards the sensors, as can be seen in FIG. 19 and FIG. 20, in which the axial offset $\Delta r$ between the axis of the armature 11 and the axis of the stator 10 is illustrated, the magnitude of the radial component $B_r$ of the magnetic induction B (magnetic field strength) at the location of the sensors $S_i$ increases (except at the symmetry positions, at which the radial component is zero). If, in contrast, the armature is moved in the radial direction from the stator center away from the sensors $S_i$, the magnitude of the radial component $B_r$ of the magnetic induction B decreases. The amount of the increase or decrease of the component $B_r$ is, of course, dependent on the angle $\phi$ at which the sensor $S_i$ is arranged relative to the axial offset $\Delta r$. In the arrangement shown in FIG. 19 and FIG. 20, this then results in the radial component $B_{r\_sens}$ of the magnetic induction measured by the respective sensor $S_i$ having a profile which is dependent on the angle $\phi$, as is illustrated in FIG. 21.

Figure 15:
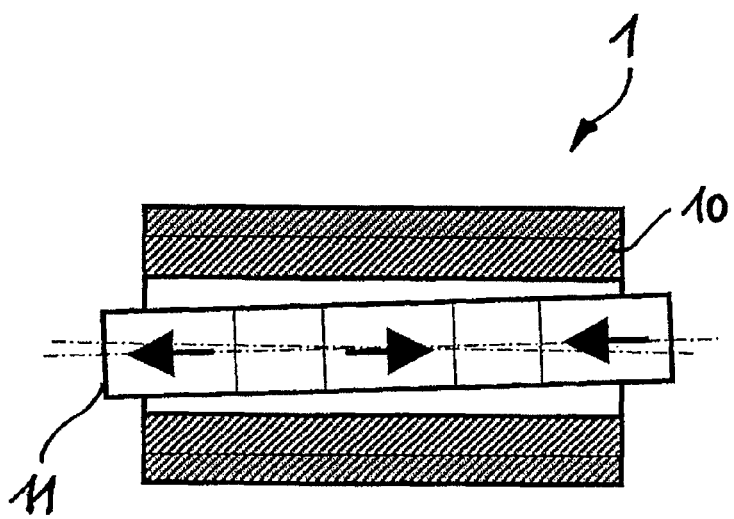

In addition, tilting of the axis of the armature 11 with respect to the axis of the stator 10 leads to a change, although in general this is a relatively minor change, in the magnetic induction. Such tilting of the axis of the armature is illustrated in FIG. 15.

FIG. 16 shows a detail of a linear motor 1 in which one of the permanent magnets PM of the armature 11 is magnetized other than in the axial direction (additional diametric magnetization component). An arrangement of the respective sensor $S_i$ as shown in FIG. 16 and FIG. 17 then leads to a dependency of the radial component of the magnetic induction $B_{r\_sens}$, as measured by the respective sensor $S_i$, as illustrated in FIG. 18.

If the armature is not designed to be rotationally symmetrical with respect to its magnetic behavior (as is generally the case), the respective instantaneous rotation angle of the armature is also a critical factor for the magnetic induction which is measured at the location of the sensors $S_i$, unless the armature is guided, and the armature cannot rotate about its axis. In general, however, the magnetic induction B is also dependent on the respective instantaneous rotation angle of the armature about its axis (or about the axis of the stator), about which the sensors $S_i$ are arranged.

An additional diametric field component of a permanent magnet will, for example, increase the magnetic induction at the location of the sensors if it is in the same direction as the radial components of the magnetic induction produced by the axial magnetization of the permanent magnets.

Thus, if the armature has a non-rotationally symmetrical magnetic field with respect to its longitudinal axis, and/or can move in the stator not only in the main movement direction but also in the lateral direction with respect to this, and/or can be rotated about all spatial axes, then this can lead, and also regularly does lead, to the possibility of undesirable errors in the determination of the armature position from the sensor signals SS1 and SS2 (see FIG. 1 and FIG. 3). This is because, in this case, at least one of the sensors measures a magnetic field (magnetic induction) which is too large or too small in comparison to ideal conditions, and which actually corresponds to an armature position which differs from the actual armature position. It is quite plausible that all of the dependencies mentioned above should be kept as small as possible since, by definition, only the axial armature position is intended to be mapped into the sensor signals, and the sensors should actually react only to the change in the axial position of the armature.

As already mentioned, for a given axial position and for a given radial position of a sensor, the discrepancy between the field and the ideal case is dependent on the instantaneous rotation angle of the armature. Since this field discrepancy at a specific axial location frequently has an approximately sinusoidal profile over the entire circumference, averaging of all the values of the magnetic field strength over the entire circumference results, in comparison to a point measurement using only one sensor at one specific location on the circumference (specifically at that location where the single sensor is arranged), in a considerable reduction in the maximum field discrepancy. Averaging of the field over the circumference at the location of the two sensors therefore leads to reduced errors in determination of the armature position.

Approximate averaging can be achieved, for example, as described in WO 03/028194, specifically in that a plurality of sensors are arranged at one specific axial location distributed over the circumference, and the signals from the individual sensors are then averaged. Since each sensor measures only a single value for the magnetic field strength, however, the quality of the averaged value of the field strength rises with respect to the exact mean value over the circumference as the number of sensors which are distributed over the circumference increases. However, both the costs, the space requirement and the complexity for evaluation of the sensor signals rise with each additional sensor. Furthermore, it is possible and should even be expected that additional disturbances will be introduced in the signal routing and the signal processing for the purpose of averaging of the sensor signals.

The invention is based on the object of proposing an apparatus which on the one hand is comparatively uncomplicated, while on the other hand offering high quality for determination of the actual armature position of a linear motor.

This object is achieved by the apparatus according to the invention, as is characterized by the features of independent patent claim 1. Developments of the apparatus according to the invention form the subject matter of the dependent patent claims.

In particular, the apparatus for determination of the axial position of the armature of a linear motor comprises at least one pair of magnetically permeable, annular elements which are arranged essentially coaxially and at a short distance from one another, such that an air gap is formed between them, in which a magnetic field sensor for measurement of the magnetic field in the air gap is arranged. In this case, in the installed state, the two annular elements surround the armature of the linear motor (although the armature itself is not a component of the apparatus according to the invention).

The annular magnetically permeable elements are arranged at a short distance from one another, that is to say they do not touch. Ideally, they form "equipotential rings", that is to say the magnetic potential is the same considered over the respective annular element. A magnetic potential difference or magnetic voltage exists between the two annular elements and is mapped in the magnetic field in the air gap between the two rings, where the magnetic field sensor is arranged which measures this magnetic field. Since the potential difference that occurs between the two annular elements is dependent on the armature position, the magnetic field measured by the magnetic field sensor in the air gap between the two annular elements is also dependent on the respective armature position.

If, for example, one now considers one of the two annular elements of such pair and assumes that the armature is offset radially with respect to the stator axis, or the permanent magnets in the armature are also magnetized diametrically in addition to the axial magnetization, the magnetic flux, considered therein, which enters an annular element will increase on one side owing to the increasing field strength (and the increasing magnetic induction), while on the other hand it will decrease, however, because of the decreasing field strength, as a result of which the overall magnetic flux which enters (or leaves) the annular element under consideration changes only slightly. Since the annular elements are magnetically permeable (and therefore effectively represent a magnetic "short circuit"), the magnetic potential is always the same, considered over the circumference of the annular element.

In a similar way that the magnetic flux which enters (or leaves) the one annular element under consideration changes only slightly, if at all, the magnetic flux which leaves (or enters) the other annular element in the same pair analogously also changes only to a minor extent, as a result of which the magnetic field between the two annular elements in the pair remains more or less unchanged (because of the likewise unchanged magnetic reluctance between the rings).

In addition, rotation of the armature about its longitudinal axis does not lead to any field change in the air gap, since the field distribution just rotates with it and therefore nothing changes in terms of the total magnetic flux entering or leaving the annular elements in a pair. The changed spatial distribution of the magnetic flux entering one magnetically permeable, annular element and that of the magnetic flux leaving the other annular element in the pair is, specifically, in each case compensated for again via the "magnetic short circuit". The magnetic potential of the two annular elements therefore remains unchanged, and in consequence the magnetic field between the two annular elements also does not change.

The apparatus according to the invention therefore makes it possible to achieve high quality in the determination of the actual armature position since those effects which can lead to inaccuracies in the determination of the armature position are eliminated or are at least very considerably reduced. At the same time, the apparatus according to the invention is relatively uncomplicated (for example only a single sensor is required in the air gap of the respective pair of annular elements, which also allows relatively simple signal routing and relatively simple evaluation of the signals). In particular, it is possible to either completely compensate for or else to very considerably reduce the negative effects described initially (for example radial movement of the armature parallel to the axis from the center of the annular elements, non-rotationally symmetrical magnetization of the permanent magnets) with respect to the actual armature position being determined as exactly as possible by means of a sine-cosine evaluation (see above).

In one exemplary embodiment of the apparatus according to the invention, at least two pairs of magnetically permeable, annular elements are provided, with, in the case of pairs which are arranged adjacent, two annular elements of different pairs forming a common annular element which is in each case associated with both pairs.

This is a physically space-saving advantageous embodiment of the apparatus according to the invention, which is also simple to manufacture. In a very general form, it can be stated that, the minimum number of annular elements which must be provided for a total n of magnetic field sensors (and therefore n air gaps) is n+1, but in principle, also no more than n+1 annular elements, which makes an exemplary embodiment such as this particularly space-saving, and simple to manufacture.

In one exemplary embodiment of the apparatus according to the invention, in each case at least one of the annular elements of the respective pair of annular elements is not completely closed when considered in the circumferential direction. By way of example, this can be advantageous when the annular magnetically permeable elements cannot be completely closed, for example for production-engineering reasons (or else for design reasons). Nothing changes with regard to the fundamental method of operation of the apparatus, because the respective magnetically permeable, annular element, as before, compensates for ("short circuits") different distributions of the magnetic flux entering one annular element and leaving the other annular element, over the circumference of the respective element, as a result of which the respective annular element forms a magnetic "equipotential ring", irrespective of whether or not it is completely closed. However, in this case, it should be noted that the saturation limit of the respective annular element is not reached or exceeded since, otherwise, the compensation process ("short circuit") does not take place or does not take place completely over the circumference of the respective annular element (and the element therefore no longer represents an "equipotential ring").

In another exemplary embodiment of the apparatus according to the invention, the cross section of at least one of the annular elements of the respective pair of annular elements is not uniform when considered in the circumferential direction. This can likewise be advantageous for production-engineering reasons, or else with respect to the arrangement of the magnetic field sensor. For example, a cutout in which the sensor is arranged can additionally be provided in an annular element on the side of the air gap. In this case, it should also be noted that the change in the cross section does not meet or exceed the saturation limit of the respective annular element since, otherwise, the compensation process ("short circuit") will not be achieved, or will not be achieved completely, over the circumference of the respective annular element (and the element therefore no longer represents an "equipotential ring"). In principle, for example, the cross section of the respective annular element may be rectangular. Those surfaces (or all surfaces from and to which no lines of force run directly to or from the adjacent ring) of the annular elements which face the magnetic source (for example the permanent magnets in the armature) are designed to be rotationally symmetrical, while the other surfaces of the annular elements (for example those which are adjacent to the air gap in which the sensor is arranged) may also be designed not to be rotationally symmetrical.

In a further exemplary embodiment of the apparatus according to the invention, the two annular elements of the respective pair between which the air gap is formed, in which air gap the sensor is arranged, are arranged coaxially at a radial distance from one another. This is likewise a physically simple and space-saving variant.

In another exemplary embodiment of the apparatus according to the invention, the two annular elements of the respective pair between which the air gap is formed are arranged coaxially at an axial distance from one another. This is an alternative to the variant in which the annular elements of the respective pair are arranged at a radial distance from one another. In the same way, it is possible to arrange the annular elements of the respective pair both at a radial distance from one another and at the same time at an axial distance from one another. All of these variants will be explained in more detail further below.

In a further exemplary embodiment of the apparatus according to the invention, two pairs of annular elements are provided and are arranged at a predefined distance from one another in the axial direction. Two pairs are required for a sine-cosine evaluation, with the predefined distance between the two pairs optimally corresponding—from the magnetic point of view—to approximately one quarter of one magnetic period (effectively 90°) or approximately one quarter of a magnetic period plus an integer multiple of half a magnetic period.

In one development of the variant, in which the two annular elements are arranged at an axial distance from one another (either with a purely axial distance between them or with an axial and radial distance between them), the two annular elements, which are arranged adjacent in the axial direction, of the two different pairs of annular elements are formed by a common annular element associated with both pairs. In other words, the two annular elements which are arranged adjacent in the various pairs are combined to form a common annular element.

A further aspect of the invention relates to a linear motor having a stator and an armature which can be moved axially relative to the stator, and having an apparatus for determination of the axial position of the armature, as mentioned in the various variants described above. In this case, the two annular elements surround the armature of the linear motor.

Linear motors are frequently provided with soft-magnetic (magnetically permeable) shielding in the form of a tube. This tube is used on the one hand as a return-path tube for guidance of the magnetic flux which is excited by permanent magnets or is excited electromagnetically, of the linear motor and on the other hand as shielding for the linear motor against external magnetic fields, and for protection of the surrounding area from magnetic fields which are produced by the linear motor.

One exemplary embodiment of the linear motor according to the invention is therefore provided with a magnetically permeable return-path tube such as this, which surrounds at least the apparatus for determination of the axial position of the armature.

In one development of this exemplary embodiment of the linear motor according to the invention, in which the two annular elements of the respective pair of annular elements of the apparatus for determination of the axial position of the armature are arranged at a radial distance from one another, the radially outer annular element of the respective pair of annular elements is formed by the magnetically permeable return-path tube. The respective radially outer annular elements can thereby be saved, and can be replaced by the return-path tube (which is present in any case). This exemplary embodiment is physically simple, economic and space-saving. In this case, for example a continuous axial slot can be provided in the return-path tube, in which the magnetic field sensors are arranged. The sensor signals can also be passed to the exterior in this slot. The slot can also be used primarily for carrying sensor signals, while the magnetic field sensors are not arranged in the slot.

In a further exemplary embodiment of the linear motor according to the invention, the magnetic return-path tube has a radial depression in which the apparatus for determination of the axial position of the armature is arranged, with the radially inner annular element of the respective pair of annular elements in each case being arranged in the depression such that it is arranged essentially at the same height as the tube wall of the return-path tube outside the depression. This allows flux guidance with narrow air gaps, and a reduction in the axial reluctance force.

Figure 5:
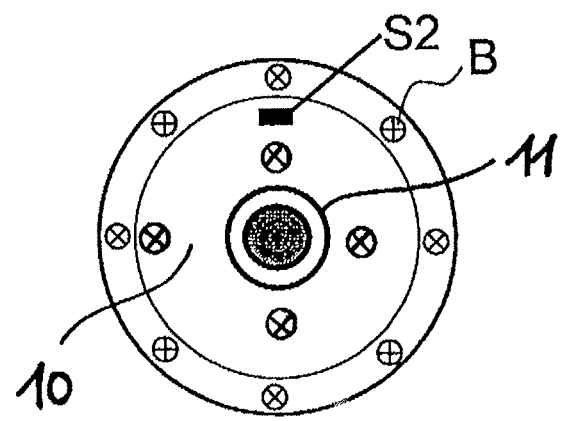
Figure 14:
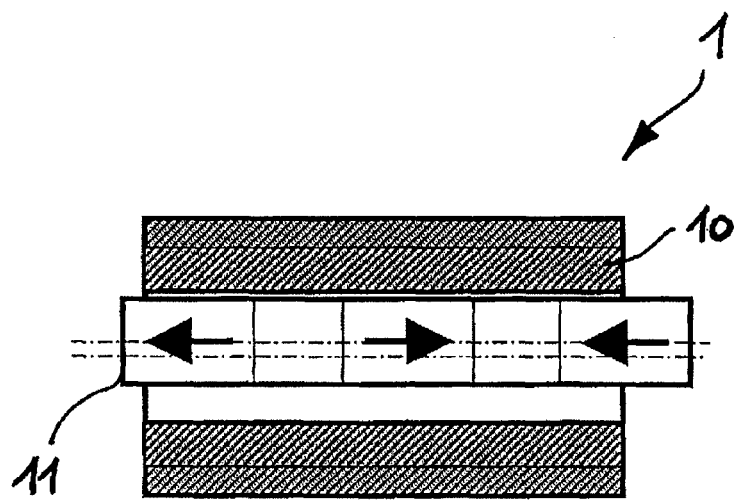
Figure 22:
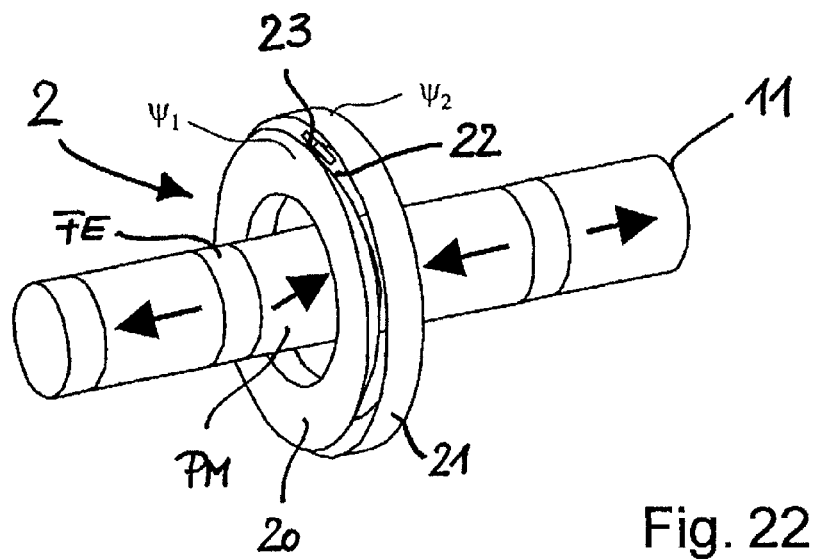
Figure 23:
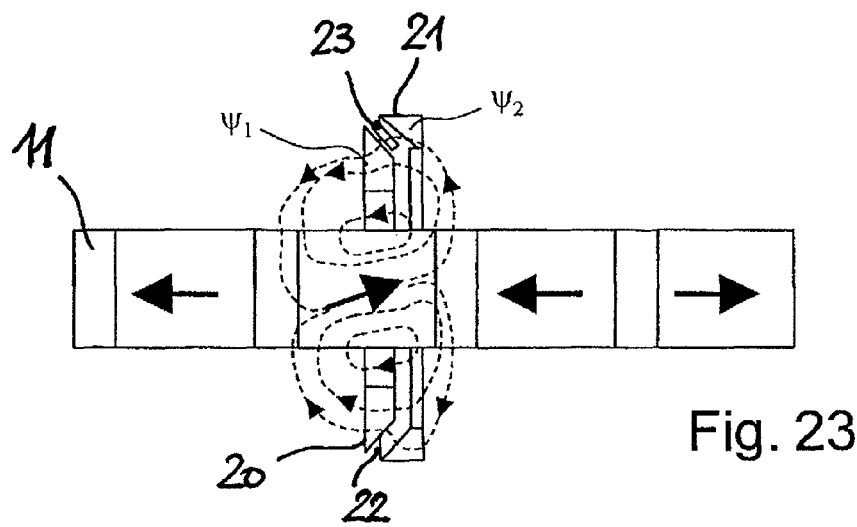
Figure 24:
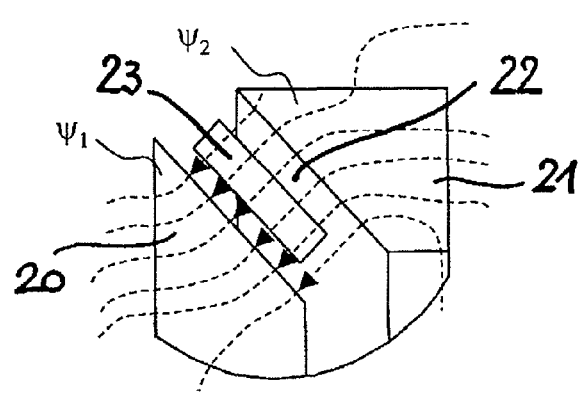
Figure 37:
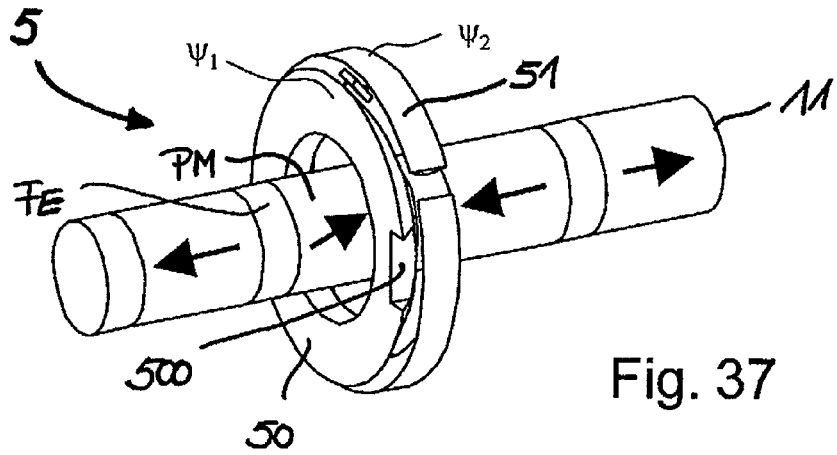
Figure 38:
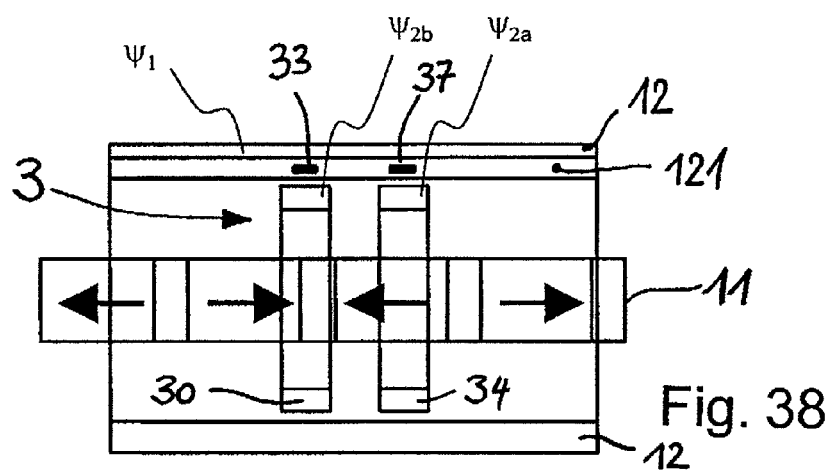
Figure 39:
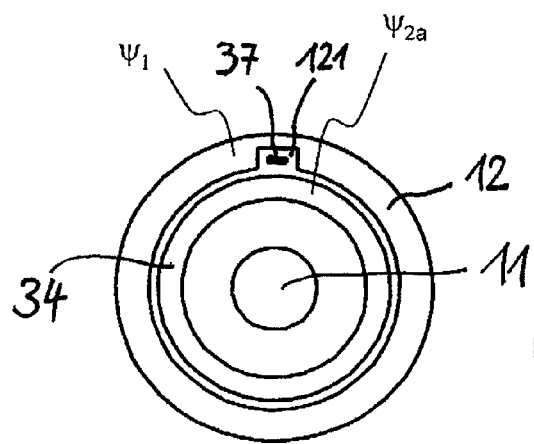
Figure 40:
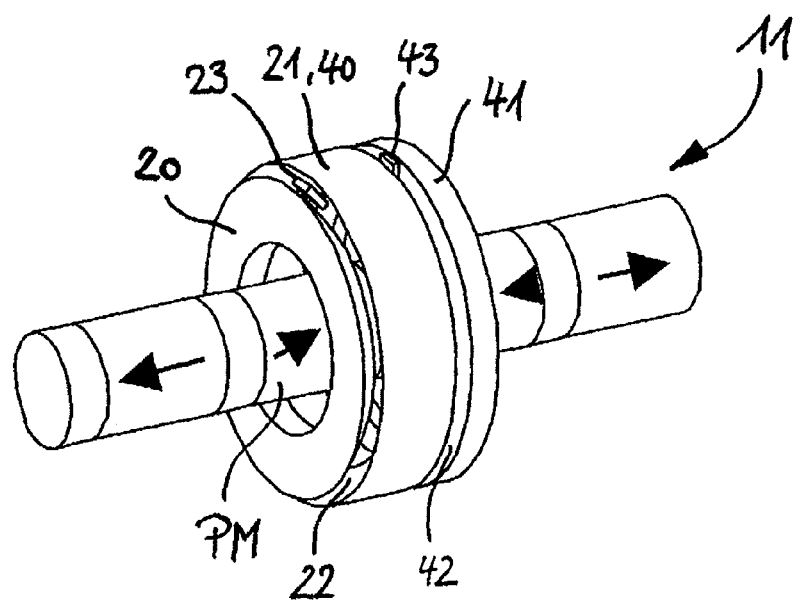
Figure 41:
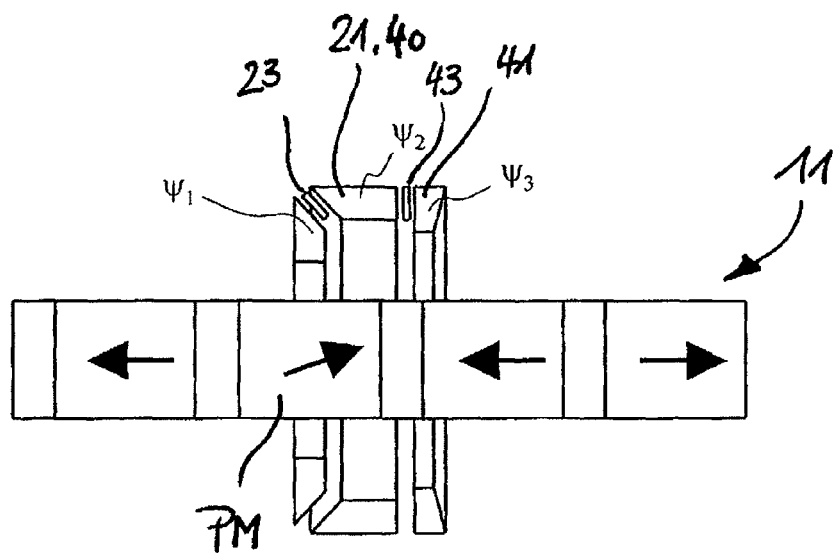

Further advantageous aspects of the apparatus according to the invention and of the linear motor according to the invention will become evident from the following description of exemplary embodiments with the aid of the drawing, in which:

FIG. 1 shows a schematic illustration of the basic design of a linear motor having two sensors for determination of the armature position, FIG. 2 shows the positional profile of the radial components of the magnetic induction in the linear motor shown in FIG. 1, FIG. 3 shows the time profile of the two sensor signals of the two sensors plotted against time, FIG. 4 shows the profile of the magnetic induction of the location of the sensor S1, in the form of a cross section through the linear motor, FIG. 5 shows the profile of the magnetic induction at the location of the sensor S2 in a cross section through the linear motor, FIGS. 6 through 13 show various exemplary embodiments of armatures and of their elements which lead to a discrepancy from the rotationally symmetrical field distribution, FIG. 14 shows a detail of a linear motor, in which the armature is offset parallel to the stator axis, thus leading to a non-rotationally symmetrical field distribution in the motor interior, FIG. 15 shows a detail of a linear motor in which the axis of the armature is tilted relative to the axis of the stator, thus leading to a non-rotationally symmetrical field distribution the motor interior, FIG. 16 shows a detail of a linear motor, in which one of the permanent magnets also has a diametric component in the magnetization, FIG. 17 shows the profile of the radial component of the magnetic induction at the location of the sensor $S_i$ from FIG. 16, in the form of a cross section, FIG. 18 shows the profile of the radial component of the magnetic induction measured by the sensor $S_i$ from FIG. 17 as a function of the angle φ of the arrangement of the sensor $S_i$, FIG. 19 shows a detail of a linear motor in which the armature is offset parallel to the axis of the stator, FIG. 20 shows the profile of the radial component of the magnetic induction at the location of the sensor $S_i$ from FIG. 19, in the form of a cross section, FIG. 21 shows the profile of the radial component of the magnetic induction measured by the sensor $S_i$ from FIG. 20 as a function of the angle φ of the arrangement of the sensor $S_i$, FIG. 22 shows a first exemplary embodiment of the apparatus for determination of the armature position of a linear motor according to the invention, with annular magnetically permeable elements arranged at a short distance from one another, FIG. 23 shows the magnetic field of a permanent magnet, which is also diametrically magnetized, in the armature of a linear motor as shown in FIG. 22, FIG. 24 shows a detail of the air gap between the two annular elements from FIG. 23, with a magnetic field sensor arranged between the elements, FIG. 25 shows a second exemplary embodiment of an apparatus according to the invention with two pairs of annular elements, which are each arranged coaxially and at a radial distance from one another, FIG. 26 shows a detail of a linear motor with an apparatus as shown in FIG. 25, which is arranged in a return-path tube of the linear motor, FIG. 27 shows a detail of a linear motor, in which the two radially outer annular elements of the apparatus according to the invention, as shown in FIG. 26, are replaced by the return-path tube of the linear motor, FIG. 28 shows a detail of a linear motor with an apparatus similar to that shown in FIG. 27, but with the return-path tube having a radial depression and with the radially inner annular element being arranged essentially at the same height as the tube wall of the return-path tube, FIG. 29 shows a third exemplary embodiment of the apparatus according to the invention with two pairs of annular elements, which are each arranged at an axial distance from one another, FIG. 30 shows a detail of a linear motor with an apparatus as shown in FIG. 29, with the two annular elements, which are arranged adjacent in the axial direction, of the two pairs of annular elements forming a common annular element, FIG. 31 shows a detail of the exemplary embodiment as shown in FIG. 27 at the location of a sensor, with a permanent magnet of the armature also having a diametric component in the magnetization, FIG. 32 shows the radial component of the magnetic induction in the air gap as shown in FIG. 31, as a function of the angle φ, FIG. 33 shows the magnetic induction in the air gap, as measured by the magnetic field sensor in FIG. 32, as a function of the angle φ of the arrangement of the sensor $S_i$, FIG. 34 shows a detail of the exemplary embodiment shown in FIG. 27, with the armature offset radially parallel to the axis, relative to the axis of the stator, FIG. 35 shows the radial component of the magnetic induction in the air gap as shown in FIG. 34, as a function of the angle φ, FIG. 36 shows the magnetic induction in the air gap, as measured by the magnetic field sensor in FIG. 35, as a function of the angle φ of the arrangement of the sensor $S_i$, FIG. 37 shows a fourth exemplary embodiment, similar to that shown in FIG. 22, but with one annular element which is not completely closed, and with the other annular element having a change in cross section (notch), FIG. 38 shows a detail of a linear motor similar to that shown in FIG. 27, but with the return-path tube having an axial slot in which the magnetic field sensors are arranged, FIG. 39 shows a side view of the detail of the linear motor corresponding to that shown in FIG. 38, FIG. 40 shows one exemplary embodiment of the apparatus according to the invention with two pairs of annular elements with two annular elements which are arranged adjacent of different pairs forming a common annular element, and FIG. 41 shows the exemplary embodiment from FIG. 40 in the form of a cross-sectional illustration.

FIG. 22 shows a first exemplary embodiment of an apparatus 2 according to the invention which comprises a pair of magnetically permeable, annular elements 20, 21 in the form of closed soft-magnetic rings. FIG. 22 also shows the armature 11 of a linear motor, which has a permanent magnet PM which has non-rotationally symmetrical magnetization (with a diametric magnetization component). The annular elements 20, 21 are arranged at (both an axial and a radial) distance from one another and define an air gap 22 between them, in which a magnetic field sensor 23 is arranged. The two soft-magnetic rings 20, 21 are at different magnetic potentials $\psi_1$ and $\psi_2$, caused by the magnetization of the permanent magnets PM in the armature.

FIG. 23 shows the profile of the magnetic field of the permanent magnet PM from FIG. 22, which also has a diametric magnetization component. As can be seen, the magnetic potentials $\psi_1$ and $\psi_2$ are different, and a magnetic field therefore exists between the two rings 20, 21. This magnetic field is mapped into the air gap field, and the respective magnetic induction resulting from this in the air gap 22 is measured by means of the magnetic field sensor 23. The magnitude of the magnetic field (and of the magnetic induction which results from this in the air gap) is dependent on the axial position of the armature, and is conversely used to determine the respectively instantaneous axial position of the armature. FIG. 24 shows a detail of the air gap 22 between the two rings 20, 21, as well as the magnetic field sensor 23 which is arranged in this air gap 22.

The method of operation of the apparatus 2 will be explained in more detail further below, but, first of all, the basic design of one advantageous exemplary embodiment and then the designs of a number of further advantageous exemplary embodiments of the apparatus according to the invention will be considered in more detail. The exemplary embodiment shown in FIG. 40 and FIG. 41 is basically a combination of the exemplary embodiment shown in FIG. 22 with a pair of annular elements as in the exemplary embodiment shown in FIG. 29 (see further below), with the annular element 20 from FIG. 22 and the annular element 41 from FIG. 29 being retained, while the annular element 21 in the pair 20, 21 (FIG. 22) and the annular element 40 in the pair 40, 41 (FIG. 29) form a common annular element, which is associated with both pairs. The magnetic field sensors 23 and 43, respectively, are arranged in the respective air gaps 22 and 42. This is a fundamental and at the same time particularly space-saving exemplary embodiment, which is simple to manufacture. The annular elements 20, the common element 21 or 40, and the annular element 41 are at the respective magnetic potentials $\psi_1$, $\psi_2$ and $\psi_3$.

Although FIG. 40 and FIG. 41 show only one exemplary embodiment of two pairs of annular elements (and that is to say two magnetic field sensors), it can be stated in an entirely general form that a minimum of n+1 annular elements are required for a total of n magnetic field sensors (and therefore for a total of n air gaps), although not more than n+1. It is admittedly possible to provide more than n+1 annular elements—and this may even be advantageous depending on the application—but the minimum number of annular elements for n magnetic field sensors is n+1.

In the second exemplary embodiment of the apparatus 3 according to the invention, as shown in FIG. 25, two pairs of magnetically permeable, annular elements 30, 31 and 34, 35 are provided, and are each arranged coaxially at a radial distance $d_r$ from one another, such that the respective air gap 32, 36 is formed between them, in which the respective magnetic field sensor 33, 37 is arranged. The two pairs of annular elements are arranged at a predefined axial distance $d_a$ from one another. This axial distance $d_a$ corresponds approximately to one quarter of a magnetic period (or approximately one quarter of a magnetic period plus an integer multiple of half a magnetic period), as a result of which the instantaneous position of the armature 11 can be determined by means of a possibly adapted sine-cosine evaluation.

FIG. 26 shows a detail of a linear motor which is provided with a return-path tube 12 in which the exemplary embodiment of the apparatus 3 according to the invention and as shown in FIG. 25 is arranged. The return-path tube 12 in the linear motor is used on the one hand for the magnetic return path and on the other hand for shielding the linear motor against disturbing external fields and for shielding the area surrounding the linear motor against magnetic fields which are produced in the linear motor.

FIG. 27 shows a detail of a linear motor in which the return-path tube 12 replaces the two radially outer rings 31, 35 of the apparatus 3, with this exemplary embodiment being particularly space-saving and less complex from the production engineering point of view.

FIG. 28 shows a detail of a linear motor having an apparatus similar to FIG. 27. However, in this case, the return-path tube 12 has a radial depression 120 in which the radially inner ring 30, 34 is arranged essentially at the same height as the tube wall of the return-path tube 12, when viewing the tube wall of the return-path tube 12 outside the radial depression 120. This exemplary embodiment is distinguished by particularly low reluctance forces.

FIG. 29 shows a third exemplary embodiment of an apparatus 4 according to the invention in which two pairs of magnetically permeable, annular elements 40, 41 and 44, 45 are provided, and are each arranged coaxially at an axial distance $d_b$ from one another, as a result of which the respective air gap 42, 46 is formed between them, in which the respective magnetic field sensor 43, 47 is arranged. The two pairs of annular elements are arranged at a predefined axial distance $d_a$ from one another. This axial distance $d_a$ ideally corresponds approximately to one quarter of a magnetic period (or one quarter of a magnetic period plus an integer multiple of half a magnetic period), as a result of which it is possible to determine the instantaneous position of the armature 11 with the aid of a sine-cosine evaluation process which, if need be, is adapted.

FIG. 30 shows a detail of a linear motor having an apparatus 4 as shown in FIG. 29, which is arranged in a return-path tube 12, but in which, in contrast to the apparatus shown in FIG. 29, the two rings 41, 44, which are arranged adjacent, of the two pairs of rings form a common (cylindrical) ring 48, which is associated with both pairs of rings.

In the following text, reference will be made to FIG. 31 to FIG. 33 to explain the fundamental method of operation of the apparatus according to the invention, in which, for explanatory purposes, the exemplary embodiment shown in FIG. 27 is used at the location of a sensor $S_i$ which may be either the sensor 33 or the sensor 37. However, in principle, the method of operation of the other exemplary embodiments is similar, because the compensation processes are carried out in an equivalent manner.

By way of example, the following text considers the location at which the sensor 33 is arranged as the sensor $S_i$. FIG. 31 shows the armature 11 with the permanent magnet PM, which also has a diametric magnetization component and generates a magnetic field with a magnetic induction $B_{PM}$, the magnitude of which is dependent on the angle $\phi$, as can be seen in FIG. 32. The magnetic potential which is caused by the non-rotationally symmetrically distributed magnetic induction $B_{PM}$ in the radially inner ring 30 is admittedly initially dependent on the angle $\phi$, since, although the ring 30 is magnetically very highly permeable and therefore approximately represents a magnetic "short circuit", this immediately compensates for any different potential distribution that may be present, as a result of which the radially inner ring 30 is at the constant magnetic potential $\psi_2$, irrespective of the angle $\phi$. In the same manner, the return-path tube 12 is at the magnetic potential $\psi_1$ irrespective of the angle $\phi$. The magnitude of the magnetic induction B (only the radial component $B_r$ is in each case considered, because this is all that is measured by the magnetic field sensor) in the air gap between the radially inner ring 30 and the return-path tube 12, that is to say where the sensor $S_i$ (at the location of the sensor 33 under consideration here) is arranged, is no longer dependent on the (circumferential) angle $\phi$. This compensates for the influence of the diametric component of the magnetization of the permanent magnet PM, which means that the flux density $B_{r\_Sens}$, as measured by the magnetic field sensor $S_i$, is no longer dependent on the angle $\phi$. This can be seen from the illustration of the magnetic induction $B_{r\_Sens}$ as measured by the magnetic field sensor, plotted against the angle $\phi$, as illustrated in FIG. 33. However, care must be taken to ensure in this case that neither the radially inner ring 30 nor the return-path tube 12 become magnetically saturated since, otherwise, the magnetic short circuit (compensation process) can no longer occur, and the magnetic potential $\psi_2$ of the radially inner ring 30 and the magnetic potential $\psi_1$ of the return-path tube are therefore no longer independent of the angle $\phi$, and the magnetic induction B caused by them in the air gap will therefore also no longer be independent of the angle $\phi$, which would mean that the magnetic induction $B_{r\_Sens}$ as measured by the magnetic field sensor $S_i$ would likewise be dependent on the angle $\phi$.

A further case in which a non-rotationally symmetrical distribution of the magnetic induction $B_{PM}$ generated by the permanent magnet PM can be caused (even though, of course, the magnetic induction is produced not only by a single permanent magnet in the armature, only the magnetic induction produced by the single permanent magnet PM is considered here, by way of example), is illustrated in FIG. 34. There, the axis of the armature 11 has been radially offset by the amount $\Delta r$ with respect to the axis of the return-path tube 12. The magnetic induction $B_{PM}$ with respect to the axis of the armature 11 without a return-path tube and without a magnetically permeable ring or rings would admittedly in principle be rotationally symmetrically distributed, but this is in fact not the case because of the radial offset $\Delta r$ of the armature with respect to the radially inner ring 30, which is arranged coaxially with respect to the axis of the return-path tube 12 (typically the stator tube). Where the ring 30 is arranged closer to the permanent magnet PM of the armature 11, the magnitude of the magnetic induction $B_{PM}$ is greater than where the ring 30 is arranged further away from the permanent magnet PM of the armature 11, and this likewise leads to the distribution of the magnetic induction $B_{PM}$ being dependent on the angle $\phi$, as can be seen in FIG. 35. The magnetic potential caused by the non-rotationally symmetrically distributed magnetic induction $B_{PM}$ in the radially inner ring 30 is admittedly initially dependent on the angle $\phi$, since the ring 30, is however, magnetically very highly permeable and thus approximately represents a magnetic "short circuit", this immediately compensates for any different potential distribution, such that the radially inner ring 30 is at the constant magnetic potential $\psi_2$ irrespective of the angle $\phi$. In the same way, the return-path tube 12 is at the magnetic potential $\psi_1$ irrespective of the angle $\phi$. The magnitude of the magnetic induction B in the air gap between the radially inner ring 30 and the return-path tube 12, that is to say where the sensor $S_i$ (at the location of the sensor 33 considered here) is arranged, is no longer dependent on the (circumferential) angle $\phi$. This compensates for the influence of the radial offset $\Delta r$ of the axis of the armature 11 with respect to the circumferential angle, which means that the flux density $B_{r\_Sens}$, as measured by the magnetic field sensor $S_i$ is no longer dependent on the angle $\phi$. This can be seen from the illustration of the magnetic induction $B_{r\_Sens}$, as measured by the magnetic field sensor, plotted against the angle $\phi$, as is illustrated in FIG. 36.

FIG. 37 shows a fourth exemplary embodiment of the apparatus 5 according to the invention, which is similar to the exemplary embodiment shown in FIG. 22, but in which the ring 50 has a cross-sectional change, in the present case a notch 500. In contrast, although the ring 51 partly surrounds the armature 11, it is, however, not completely closed. Such cross-sectional changes (such as the notch in the present case) or embodiments of a ring which are not completely closed may, for example, be a result of production engineering factors, or may be advantageous from the design point of view for an arrangement in a linear motor. With good positioning and with a small physical extent in comparison, they result in no change, or in only an insignificant change, in the method of operation, provided that the ring 50 does not become magnetically saturated with respect to the cross-sectional change (see the comments relating to the method of operation further above). The magnetic short circuit (compensation process) likewise occurs with respect to the incompletely closed embodiment of the ring 51 since, in fact, the individual parts of the ring 51 are magnetically permeably connected to one another, as before, in such a way that—as explained further above—the magnetic potentials $\psi_1$ and $\psi_2$, respectively, are generated at the rings 50 and 51.

Finally, FIG. 38 and FIG. 39 show a detail of a linear motor, using an exemplary embodiment of the apparatus 3 according to the invention similar to that in FIG. 27. However, the return-path tube 12 is provided with an axial slot 121, in which the two magnetic field sensors 33, 37 are arranged. In this case, it is not only possible to arrange the magnetic field sensors 33, 37 in the axial slot 121, but it is also possible to pass the sensor signals out in this axial slot 121 (in addition, only the sensor signals can be passed out in this axial slot, while the magnetic field sensors are arranged at a different point). The magnetic potentials $\psi_{2b}$ and $\psi_{2a}$, respectively, are generated on the radially inner rings 30 and 34, while the magnetic potential $\psi_1$ is generated in the return-path tube (precondition: the saturation limit is not reached, see above).

The invention has been explained above with reference to exemplary embodiments. However, these should be considered only as examples and are not intended to restrict the scope of protection. In particular, alternatives are feasible which likewise make use of the teaching according to the invention. The scope of protection is therefore intended to be defined only by the following claims.

The invention claimed is:

1. An apparatus for determination of an axial position of an armature of a linear motor, the apparatus comprising:
    at least one pair of magnetically permeable, annular elements, disposed substantially coaxially and at a short distance from one another, such that an air gap is defined between the magnetically permeable annular elements, wherein each of the annular elements is magnetically permeable so as to represent a magnetic short circuit such that a magnetic potential of each annular element is always constant along a circumference of the respective annular element; and
    a magnetic field sensor disposed in the air gap for measurement of the magnetic field in the air gap;
    wherein the magnetically permeable annular elements surround the armature of the linear motor, in the installed state; and wherein:
        (a) the annular elements comprise different radii from one another and are concentric, such that the distance consists of a radial distance; or
        (b) the annular elements comprise identical radii and are axially spaced from one another, such that the distance consists of an axial distance; or
        (c) the annular elements comprise different radii and are axially spaced from one another, such that the distance comprises a radial component and an axial component;
    wherein the magnetically permeable annular elements comprise at least one common annular element and at least two individual annular elements, wherein the common annular element is associated with both of the individual annular elements to thereby define at least two pairs of annular elements.

2. An apparatus for determination of an axial position of an armature of a linear motor, the apparatus comprising:
    at least one pair of magnetically permeable, annular elements, disposed substantially coaxially and at a short distance from one another, such that an air gap is defined between the magnetically permeable annular elements, wherein each of the annular elements is magnetically permeable so as to represent a magnetic short circuit such that a magnetic potential of each annular element is always constant along a circumference of the respective annular element; and
    a magnetic field sensor disposed in the air gap for measurement of the magnetic field in the air gap;
    wherein the magnetically permeable annular elements surround the armature of the linear motor, in the installed state; and wherein:
        (a) the annular elements comprise different radii from one another and are concentric, such that the distance consists of a radial distance; or
        (b) the annular elements comprise identical radii and are axially spaced from one another, such that the distance consists of an axial distance; or
        (c) the annular elements comprise different radii and are axially spaced from one another, such that the distance comprises a radial component and an axial component;
    wherein at least one of the annular elements is not completely closed in a circumferential direction thereof.

3. An apparatus for determination of an axial position of an armature of a linear motor, the apparatus comprising:
    at least one pair of magnetically permeable, annular elements, disposed substantially coaxially and at a short distance from one another, such that an air gap is defined between the magnetically permeable annular elements, wherein each of the annular elements is magnetically permeable so as to represent a magnetic short circuit such that a magnetic potential of each annular element is always constant along a circumference of the respective annular element; and
    a magnetic field sensor disposed in the air gap for measurement of the magnetic field in the air gap;
    wherein the magnetically permeable annular elements surround the armature of the linear motor, in the installed state; and wherein:
        (a) the annular elements comprise different radii from one another and are concentric, such that the distance consists of a radial distance; or
        (b) the annular elements comprise identical radii and are axially spaced from one another, such that the distance consists of an axial distance; or
        (c) the annular elements comprise different radii and are axially spaced from one another, such that the distance comprises a radial component and an axial component;
    wherein a cross section of at least one of the annular elements is not uniform in a circumferential direction thereof.

4. An apparatus for determination of an axial position of an armature of a linear motor, the apparatus comprising:
    at least one pair of magnetically permeable, annular elements, disposed substantially coaxially and at a short distance from one another, such that an air gap is defined between the magnetically permeable annular elements, wherein each of the annular elements is magnetically permeable so as to represent a magnetic short circuit such that a magnetic potential of each annular element is always constant along a circumference of the respective annular element; and
    a magnetic field sensor disposed in the air gap for measurement of the magnetic field in the air gap;
    wherein the magnetically permeable annular elements surround the armature of the linear motor, in the installed state; and wherein:
        (a) the annular elements comprise different radii from one another and are concentric, such that the distance consists of a radial distance; or
        (b) the annular elements comprise identical radii and are axially spaced from one another, such that the distance consists of an axial distance; or
        (c) the annular elements comprise different radii and are axially spaced from one another, such that the distance comprises a radial component and an axial component;
    wherein the at least one pair of annular elements comprises two pairs of annular elements axially spaced from one another;
    wherein the annular elements comprise at least one common annular element and at least two individual annular elements, wherein the common annular element is associated with both of the individual annular elements to thereby define the two pairs.

5. A linear motor, comprising:
    a stator;
    an armature which can be moved axially relative to the stator; and an apparatus for determination of an axial position of the armature, comprising:
  at least one pair of magnetically permeable, annular elements, disposed surrounding the armature of the linear motor substantially coaxially and at a short distance from one another, such that an air gap is defined between the magnetically permeable annular elements, wherein each of the annular elements is magnetically permeable so as to represent a magnetic short circuit such that a magnetic potential of each annular element is always constant along a circumference of the respective annular element; and
  a magnetic field sensor disposed in the air gap for measurement of the magnetic field in the air gap; wherein:
    (a) the annular elements comprise different radii from one another and are concentric, such that the distance consists of a radial distance; or
    (b) the annular elements comprise identical radii and are axially spaced from one another, such that the distance consists of an axial distance; or
    (c) the annular elements comprise different radii and are axially spaced from one another, such that the distance comprises a radial component and an axial component;
  wherein the magnetically permeable annular elements comprise at least one common annular element and at least two individual annular elements, wherein the common annular element is associated with both of the individual annular elements to thereby define at least two pairs of annular elements.

6. The linear motor of claim 5, wherein the at least one common annular element comprises a magnetically permeable return-path tube, which surrounds the at least two individual annular elements.

7. The linear motor of claim 6, wherein the magnetic return-path tube comprises a radial depression, wherein the at least two individual annular elements are disposed in the depression substantially at the same height as a tube wall of a remainder of the return-path tube outside the depression.

* * * * *